US012258981B2

(12) United States Patent
Bo et al.

(10) Patent No.: US 12,258,981 B2
(45) Date of Patent: Mar. 25, 2025

(54) INTEGRATED HYDRAULIC POWER DEVICE AND FIRE TRUCK

(71) Applicant: JIANGSU XCMG CONSTRUCTION MACHINERY RESEARCH INSTITUTE LTD., Xuzhou (CN)

(72) Inventors: Fuxiang Bo, Xuzhou (CN); Bing He, Xuzhou (CN); Shuaitong Wang, Xuzhou (CN); Liangwei Lu, Xuzhou (CN)

(73) Assignee: JIANGSU XCMG CONSTRUCTION MACHINERY RESEARCH INSTITUTE LTD., Xuzhou (CN)

( * ) Notice: Subject to any disclaimer, the term of this patent is extended or adjusted under 35 U.S.C. 154(b) by 3 days.

(21) Appl. No.: 18/306,642

(22) Filed: Apr. 25, 2023

(65) Prior Publication Data

US 2024/0318671 A1 Sep. 26, 2024

(30) Foreign Application Priority Data

Mar. 23, 2023 (CN) ......................... 202310296483.3

(51) Int. Cl.

| | |
|---|---|
| ***F15B 13/10*** | (2006.01) |
| ***F15B 1/26*** | (2006.01) |
| ***F15B 13/04*** | (2006.01) |

(52) U.S. Cl.

CPC ............ *F15B 13/0401* (2013.01); *F15B 1/26* (2013.01); *F15B 13/10* (2013.01)

(58) Field of Classification Search

CPC .. F15B 1/26; F15B 13/04; F15B 13/10; F04B 23/023

See application file for complete search history.

(56) References Cited

FOREIGN PATENT DOCUMENTS

| | | | | | |
|---|---|---|---|---|---|
| CN | 109340219 | A | | 2/2019 | |
| CN | 211692996 | U | | 10/2020 | |
| CN | 216157977 | U | | 4/2022 | |
| DE | 19739233 | A1 | * | 3/1999 | ............ F04B 23/023 |
| DE | 10028957 | C2 | * | 7/2002 | .............. F04B 17/03 |
| KR | 20020029271 | A | * | 4/2002 | ............. A62C 27/00 |
| WO | WO-2019101674 | A1 | * | 5/2019 | .............. F04B 17/03 |

OTHER PUBLICATIONS

Machine Translation for the Foreign Documents listed above are merged with the original documents.*

* cited by examiner

*Primary Examiner* — Kenneth Bomberg
*Assistant Examiner* — Daniel S Collins
(74) *Attorney, Agent, or Firm* — Myers Bigel, P.A.

(57) ABSTRACT

The present disclosure relates to an integrated hydraulic power device and a fire truck. The integrated hydraulic power device includes: an integrated valve including a valve body having an internal flow passage structure, a first mounting end and a second mounting end; a motor fixedly arranged at the first mounting end; a hydraulic oil tank fixedly arranged at the second mounting end; and a hydraulic pump located within the hydraulic oil tank and in drive connection with the motor, wherein the hydraulic pump has an oil suction port for drawing oil from the hydraulic oil tank, and the internal flow passage structure is communicated with the hydraulic oil tank and the hydraulic pump.

19 Claims, 6 Drawing Sheets

INTEGRATED HYDRAULIC POWER DEVICE AND FIRE TRUCK

CROSS-REFERENCE TO RELATED APPLICATIONS

The present disclosure is based upon and claims priority to Chines patent application No. 202310296483.3, filed on Mar. 23, 2023, whose entire contents are incorporated herein by reference.

TECHNICAL FIELD

The present disclosure relates to the field of hydraulic technology, in particular to an integrated hydraulic power device and a fire truck.

BACKGROUND

Aerial ladder fire trucks, lift-up fire engines, aerial work platforms, etc. are emergency rescue equipment for the implementation of high-level firefighting, personnel rescue, and special operations. An aerial working platform needs to have a variety of functions such as carrying persons, carrying rescue equipment, and firefighting, which poses high requirements on light-weighting and space-saving of the platform. In order to achieve light-weighting, an aluminum alloy structure has come into use in aerial platforms for fire trucks in the industry.

SUMMARY

After research, the inventor has found that, at present, an aluminum alloy structure is mainly used for such structures as a base plate and a guard fence of a fire truck aerial platform, while a hydraulic power system in the fire truck aerial platform occupies limited space of the fire truck aerial platform and accounts for up to 30% of the weight of the platform. Hydraulic power system elements such as a hydraulic pump, a hydraulic valve, a motor, and hydraulic pipelines are still designed and manufactured in a traditional way, thus limiting further light-weighting of the fire truck aerial platform.

In view of this, embodiments of the present disclosure provide an integrated hydraulic power device and a fire truck, which can reduce space occupation.

In an aspect of the present disclosure, an integrated hydraulic power device is provided, including: an integrated valve including a valve body having an internal flow passage structure, a first mounting end and a second mounting end; a motor fixedly arranged at the first mounting end; a hydraulic oil tank fixedly arranged at the second mounting end; and a hydraulic pump located within the hydraulic oil tank and in drive connection with the motor, wherein the hydraulic pump has an oil suction port for drawing oil from the hydraulic oil tank, and the internal flow passage structure is communicated with the hydraulic oil tank and the hydraulic pump.

In some embodiments, the integrated hydraulic power device further includes: an oil port component provided within the hydraulic oil tank, configured to implement oil return from the internal flow passage structure to the hydraulic oil tank, and/or to implement oil supply from the hydraulic oil tank to an external backup power system through the internal flow passage structure.

In some embodiments, the internal flow passage structure has a valve body oil inlet, and the oil port component includes an oil port end and a hose, one end of the hose is connected to the valve body oil inlet and the other end of the hose is fluidly connected to the oil port end.

In some embodiments, the oil port component further includes a filter, which is located at the oil port end.

In some embodiments, the valve body is a metal 3D printing valve body.

In some embodiments, a diameter of flow passages in the internal flow passage structure is less than or equal to 6 mm.

In some embodiments, a material of the metal 3D printing valve body includes stainless steel, aluminum-magnesium-copper alloy, aluminum-magnesium-copper-zinc alloy, or aluminum-magnesium-silicon alloy.

In some embodiments, the valve body further has a plug-in port, and the integrated valve further includes a hydraulic control plug-in connector, which is plugged in the plug-in port and communicated with the internal flow passage structure.

In some embodiments, the motor is a servo motor, and the integrated valve is a pump-controlled control valve, and the hydraulic control plug-in connector includes at least one of a first one-way valve, an solenoid directional control valve, first shuttle valves, a first overflow valve and a first pressure measuring valve.

In some embodiments, the motor is a DC brushless motor, and the integrated valve is a valve-controlled control valve, and the hydraulic control plug-in connector includes at least one of a second one-way valve, a pressure compensator, an electromagnetic proportional reversing valve, second shuttle valves, a second overflow valve, and a second pressure measuring valve.

In some embodiments, the first mounting end and the second mounting end are located on two opposite sides of the valve body, and the valve body also has a central hole running through the first mounting end and the second mounting end, a power output shaft of the motor is in drive connection with the hydraulic pump through a coupling provided in the central hole.

In some embodiments, the motor is threaded connected to a plurality of motor mounting fixing holes located at the first mounting end by means of bolts, and/or the hydraulic oil tank is threaded connected to a plurality of tank mounting fixing holes located at the second mounting end by means of bolts.

In some embodiments, a material of the hydraulic oil tank is a non-metallic material.

In some embodiments, the non-metallic material includes polyethylene or polypropylene.

In some embodiments, the hydraulic oil tank includes: a first part, which is cylindrical in shape and has one end connected to the second mounting end; and a second part, which is connected to the other end of the first part away from the valve body and is internally communicated with the first part, wherein in an axis direction of the first part, an inner cavity cross-sectional area of the second part is larger than an inner cavity cross-sectional area of the first part.

In some embodiments, an open end of the hydraulic oil tank has an annular flange that protrudes radially outward, and the integrated hydraulic power device further includes: a clamping ring sleeved outside the annular flange, the hydraulic oil tank being fixed to the second mounting end by means of bolts and the clamping ring; a first seal ring located between the second mounting end and an inner cavity surface of the open end; and a second seal ring located between the second mounting end and the clamping ring.

In some embodiments, the clamping ring includes a plurality of segments, and the plurality of segments are connected successively along a circumferential direction of the clamping ring.

In some embodiments, the first seal ring includes an O-ring seal, and the second seal ring includes a flat washer.

In an aspect of the present disclosure, a fire truck is provided, including:

the integrated hydraulic power device described above.

In some embodiments, the fire truck is an aerial ladder fire truck, a lift-up fire engine or an aerial work platform truck.

Therefore, according to embodiments of the present disclosure, the motor and the hydraulic oil tank are respectively fixedly arranged at the two mounting ends of the valve body of the integrated valve, and the hydraulic pump driven by the motor is arranged within the hydraulic oil tank and draws the oil directly from the hydraulic oil tank. Such an integrated hydraulic power device can achieve hydraulic oil output of the hydraulic oil tank by using the motor and the hydraulic pump, and guide and control the hydraulic oil through the internal flow passage structure of the integrated valve. Moreover, in such an integrated hydraulic power device structure, the motor and the hydraulic oil tank are assembled by means of the mounting ends of the valve body, and the hydraulic pump is arranged within the hydraulic oil tank, such that the integrated hydraulic power device structure is very compact and many external pipelines are omitted, thus effectively reducing space occupation.

BRIEF DESCRIPTION OF THE DRAWINGS

The drawings constituting a part of the specification describe embodiments of the present disclosure, and together with the specification, serve to explain the principle of the present disclosure.

With reference to the accompanying drawings, the present disclosure can be understood more clearly according to the following detailed description, in which.

It should be appreciated that the sizes of various parts shown in the drawings are not drawn in accordance with actual proportional relationships. In addition, same or similar reference numerals represent same or similar components.

DETAILED DESCRIPTION

Various exemplary embodiments of the present disclosure will now be described in detail with reference to the accompanying drawings. The description of the exemplary embodiments is only illustrative, and in no way serves as any limitation on the present disclosure and its application or use. The present disclosure can be implemented in many different forms and is not limited to the embodiments described herein. These embodiments are provided to make the present disclosure thorough and complete and to express fully the scope of the present disclosure to those skilled in the art. It is to be noted that unless specifically stated otherwise, the relative arrangement of components and steps, material components, numerical expressions and numerical values set forth in these embodiments should be construed as merely exemplary, rather than as limitations.

The words "first", "second" and the like used in present disclosure do not indicate any order, quantity or importance, but are only used to distinguish different parts. The word "comprise" or "include" or the like means that an element preceding the word covers listed elements following the word, and does not exclude the possibility of also covering other elements. The words "up", "down", "left", "right" and the like are only used to indicate a relative positional relationship. When the absolute position of a described object changes, the relative positional relationship may also change accordingly.

In the present disclosure, when a particular device is described to be located between a first device and a second device, there may or may not be an intermediate device between the particular device and the first device or the second device. When a particular device is described to be connected to other device, the particular device may be directly connected to the other device without an intermediate device, or it may be not directly connected to the other device but there is an intermediate device.

All terms (including technical or scientific terms) used in the present disclosure have the same meaning as understood by those of ordinary skill in the field of the present disclosure, unless otherwise defined specifically. It should also be understood that terms such as those defined in generic dictionaries should be understood to have meanings consistent with their meanings in the context of the related art, and should not be construed in an idealized or overly formalized sense, unless so defined explicitly herein.

Technologies, methods, and equipment known to those of ordinary skill in the related art may be not discussed in detail, but where appropriate, the technologies, methods, and equipment should be regarded as part of the specification.

Figure 1:
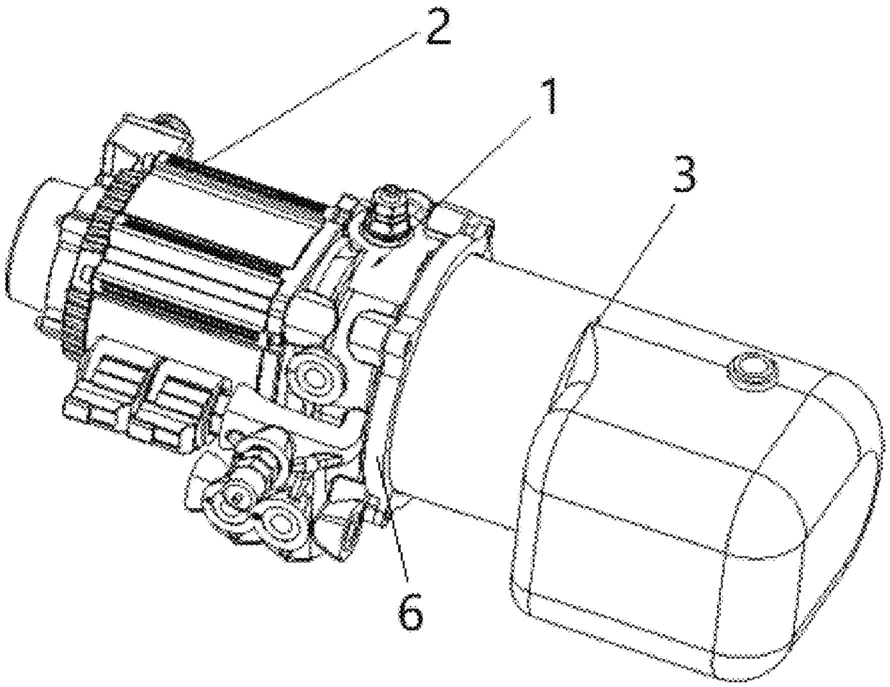
FIG. 1 is an installation structural diagram of some embodiments of an integrated hydraulic power device according to the present disclosure.
Figure 2:
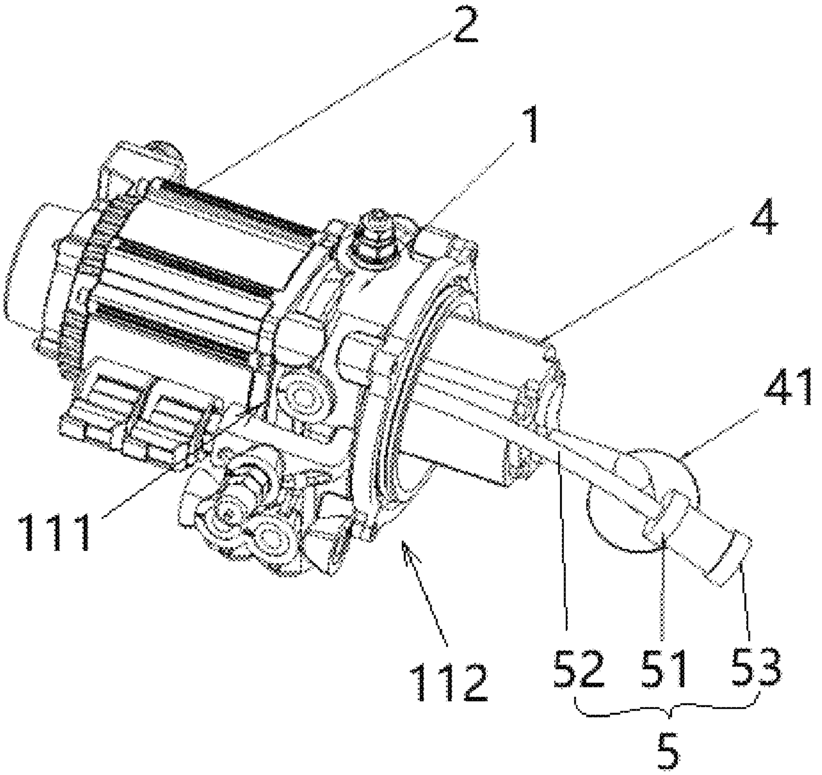
FIG. 2 is a schematic view of the installation structure in which a hydraulic oil tank is omitted FIG. 1.
Figure 3:
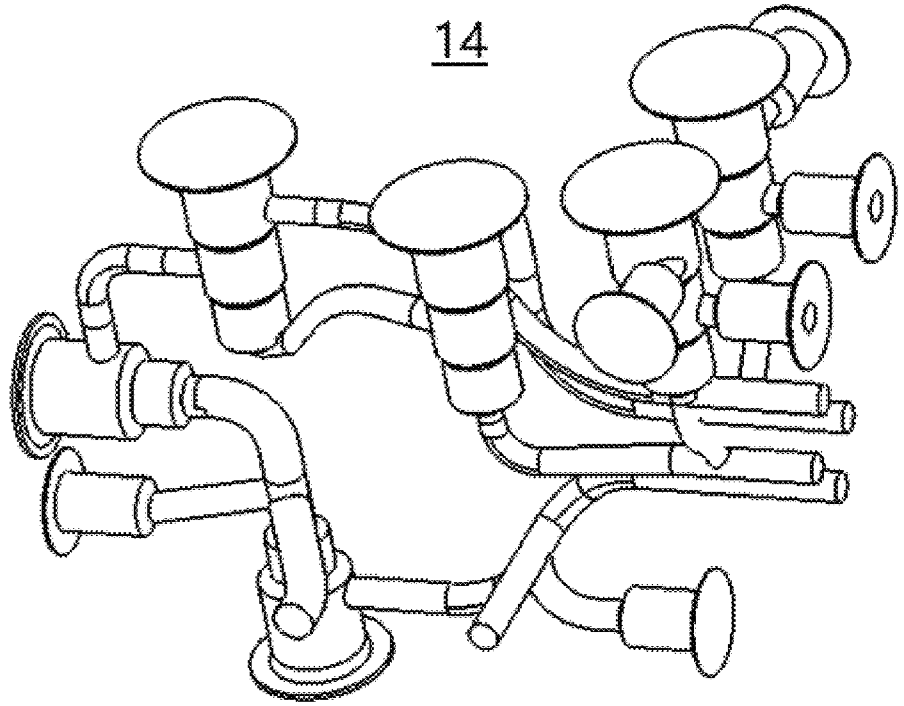
FIG. 3 is a schematic diagram of an internal flow passage structure of a valve body in embodiments of an integrated hydraulic power device according to the present disclosure.

FIG. 1 is an installation structural diagram of some embodiments of an integrated hydraulic power device according to the present disclosure. FIG. 2 is a schematic view of the installation structure in which a hydraulic oil tank is omitted FIG. 1. FIG. 3 is a schematic diagram of an internal flow passage structure of a valve body in embodiments of an integrated hydraulic power device according to the present disclosure.

Referring to FIGS. 1 to 3, embodiments of the present disclosure provide an integrated hydraulic power device. The integrated hydraulic power device includes: an integrated valve 1, a motor 2, a hydraulic oil tank 3, and a hydraulic pump 4. The integrated valve 1 includes a valve body 11. The valve body 11 has an internal flow passage structure 14, a first mounting end 111 and a second mounting end 112. Hydraulic oil can flow in flow passages of the internal flow passage structure 14 in order to achieve hydraulic functions as working oil or control oil.

The motor 2 is fixedly arranged at the first mounting end 111. The hydraulic oil tank 3 is fixedly arranged at the second mounting end 112. The hydraulic pump 4 is located within the hydraulic oil tank 3 and is in drive connection with the motor 2. The hydraulic pump 4 has an oil suction port 41 for drawing oil from the hydraulic oil tank 3. The internal flow passage structure 14 is communicated with the hydraulic oil tank 3 and the hydraulic pump 4.

The motor 2 can output a torque to the hydraulic pump 4 to drive the hydraulic pump 4 to operate, so that the hydraulic pump 4 draws hydraulic oil from the hydraulic oil tank 3 and outputs the hydraulic oil to the internal flow path structure 14. The hydraulic oil in the hydraulic oil tank 3 may be drawn directly into the hydraulic pump 4, and may also be drawn into the hydraulic pump 4 through the internal flow passage structure 14 of the valve body 11.

The hydraulic pump 4 can be, but is not limited to, a gear pump. The hydraulic pump can be fixed to the second mounting end 112 of the valve body by means of a bolt and embedded within the hydraulic oil tank 3 to achieve oil suction under direct drive of the motor 2. Such a structure of embedding the hydraulic pump within the oil tank can effectively utilize the volume of internal space and reduce the volume of an integrated unit.

In this embodiment, the motor and the hydraulic oil tank are respectively fixedly arranged at the two mounting ends of the valve body of the integrated valve, and the hydraulic pump driven by the motor is arranged within the hydraulic oil tank and draws the oil directly from the hydraulic oil tank. Such an integrated hydraulic power device can achieve hydraulic oil output of the hydraulic oil tank by using the motor and the hydraulic pump, and guide and control the hydraulic oil through the internal flow passage structure of the integrated valve. Moreover, in such an integrated hydraulic power device structure. The motor and the hydraulic oil tank are assembled by means of the mounting ends of the valve body, and the hydraulic pump is arranged within the hydraulic oil tank, such that the integrated hydraulic power device structure is very compact and many external pipelines are omitted, thus effectively reducing space occupation.

Referring to FIG. 2, in some embodiments, the integrated hydraulic power device further includes an oil port component 5. The oil port component 5 is provided within the hydraulic oil tank 3 and can implement oil return from the internal flow passage structure 14 to the hydraulic oil tank 3.

The oil port component 5 can also implement oil supply from the hydraulic oil tank 3 to an external backup power system through the internal flow passage structure 14. That is, in addition to supplying the hydraulic oil to the hydraulic pump 4, the hydraulic oil tank 3 can also supply the hydraulic oil to an external backup power system (e.g., a manual or electric power unit).

Referring to FIG. 2, in some embodiments, the valve body 11 further has a valve body oil inlet 112*c* (referring to FIG. 7), and the oil port component 5 includes an oil port end 51 and a hose 52. One end of the hose 52 is connected to the valve body oil inlet 112*c* and the other end of the hose 52 is fluidly connected to the oil port end 51. The oil port end 51 is relatively heavy and can be made of a metal material.

Since the hose 52 is flexible, it can be bent and swung. Thus, by using the self-weight of the oil port end 51, the oil port end 51 is always located at a low position of the whole hydraulic oil tank 3, thereby always remaining in effective contact with the oil in the hydraulic oil tank 3, as the attitude and position of the integrated hydraulic power device change. This ensures the versatility of the integrated hydraulic power device in both rotating and stationary scenarios.

To ensure the purity of the hydraulic oil sucked into the hydraulic pump 4, in some embodiments, the oil port component 5 further includes a filter 53. The filter 53 is located at the oil port end 51. The hydraulic oil entering the oil port end 51 is filtered by the filter 53.

To achieve the function of internal flow passages of the integrated hydraulic power device and a communication relationship with external elements, in some embodiments, the valve body 11 is a metal 3D printing valve body. That is to say, the valve body 11 can be formed by a metal 3D printing process according to a designed valve body model. The metal 3D printing process may include a direct metal laser sintering process, a selective laser melting process or an electron beam melting process.

Using the metal 3D printing process to form the valve body 11 can achieve shape follow-up design and compact arrangement of hydraulic flow passages, and reduce a flow passage pressure loss by 60% or more. Referring to a topological structure of internal flow passages shown in FIG. 3, a diameter of the internal flow passages of the valve body 11 is less than or equal to 6 mm, which can improve the integration level of the valve body, reduce the size of the valve body, lower the weight of the valve body, and reduce the manufacturing difficulty of the valve body.

In order to achieve light-weighting of the valve body, the material of the metal 3D printing valve body may include stainless steel, aluminum-magnesium-copper alloy, aluminum-magnesium-copper-zinc alloy, or aluminum-magnesium-silicon alloy. The material of the metal 3D printing valve body can be selected according to a system pressure of a hydraulic system. In some embodiments, if the system pressure is greater than or equal to 20 MPa, then stainless steel, aluminum-magnesium-copper alloy, aluminum-magnesium-copper-zinc alloy or the like can be selected. In some other embodiments, if the system pressure is less than 20 MPa, aluminum-magnesium-silicon alloy such as AlSi10 Mg, or the like can be selected.

In designing of the valve body of the integrated valve, an optimal mode of placement can be determined based on a support volume and printing time calculated by Magic software; and the metal 3D printing process of the integrated valve can be designed based on a nesting method of multiple types of support structures in conjunction with a reverse deformation compensation strategy. A reverse deformation compensation model is exported by using a simulation software, and a compensation ratio can be set to −0.8. Using a reverse deformation compensation printing process, the printing precision of the valve body of the integrated valve is improved by 50% or more.

Figure 4:
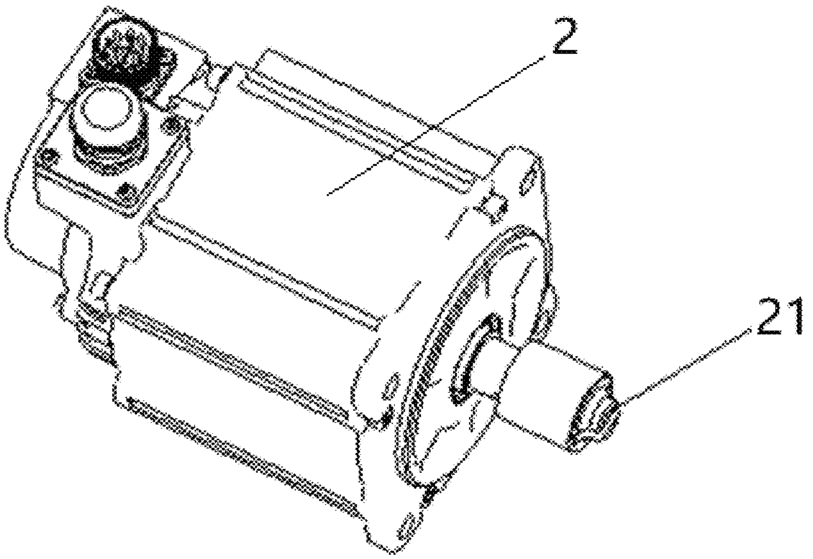
FIG. 4 is a structural diagram of a motor in embodiments of an integrated hydraulic power device according to the present disclosure.

FIG. 4 is a structural diagram of a motor in embodiments of an integrated hydraulic power device according to the present disclosure. Referring to FIG. 4, in some embodiments, the motor 2 can be a DC brushless motor or a servo motor. For different motor types, corresponding types of integrated valves can be used in combination therewith.

In some embodiments, the valve body 11 further has a plug-in port, and the integrated valve 1 further includes a hydraulic control plug-in connector, which is plugged in the plug-in port. The type of the integrated valve can be determined based on differences in factors such as the internal flow path structure of the valve body and the type and number of the hydraulic control plug-in connector that is plugged in the valve body.

Figure 5:
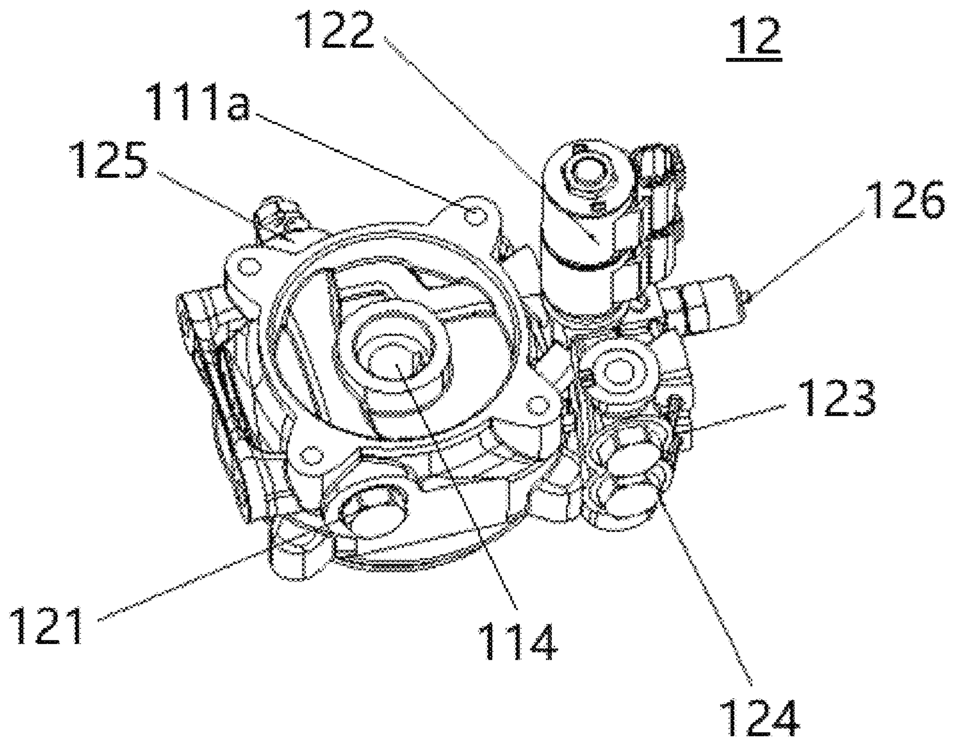
FIG. 5 is a structural diagram of a pump-controlled control valve in embodiments of an integrated hydraulic power device according to the present disclosure.

FIG. 5 is a structural diagram of a pump-controlled control valve in embodiments of an integrated hydraulic power device according to the present disclosure. Referring to FIG. 5, in some embodiments, the motor 2 is a servo motor, and accordingly, the integrated valve 1 is a pump-controlled control valve 12, and the hydraulic control plug-in connector includes at least one of a first one-way valve 121, an solenoid directional control valve 122, first shuttle valves 123, 124, a first overflow valve 125, and a first pressure measuring valve 126.

By configuring the first shuttle valves 123, 124, it facilitates connecting a backup power system externally of an integrated hydraulic power unit to achieve double protection; by configuring the first one-way valve 121, it prevents return of a flow output from the pump; by configuring the solenoid directional control valve 122, the direction of the hydraulic oil can be changed; by configuring the first pressure measuring valve 126, an output pressure at a pump port is monitored; and by configuring the first overflow valve 125, it can provide overflow safety protection for the hydraulic system.

Figure 6:
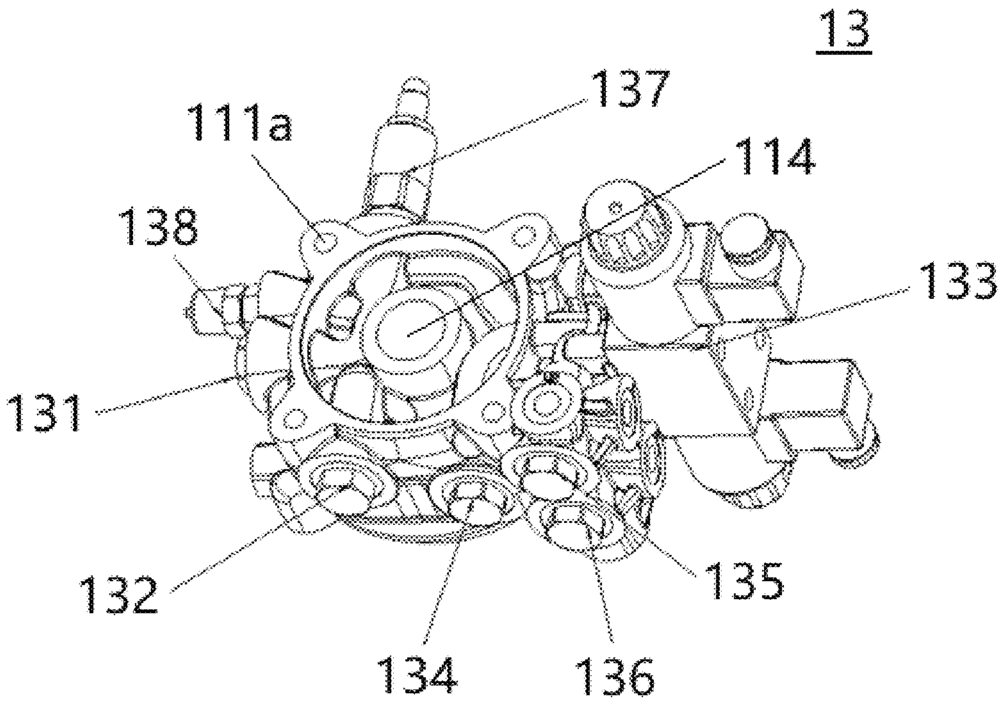
FIG. 6 is a structural diagram of a valve-controlled control valve in embodiments of an integrated hydraulic power device according to the present disclosure.

FIG. 6 is a structural diagram of a valve-controlled control valve in embodiments of an integrated hydraulic power device according to the present disclosure. Referring to FIG. 6, in some embodiments, the motor 2 is a DC brushless motor, and accordingly the integrated valve 1 is a valve-controlled control valve 13, and the hydraulic control plug-in connector includes at least one of a second one-way valve 131, a pressure compensator 132, an electromagnetic proportional reversing valve 133, second shuttle valves 134, 135, 136, a second overflow valve 137, and a second pressure measuring valve 138.

By configuring the second shuttle valves 134, 135, 136, it facilitates connecting a backup hydraulic power unit externally of an integrated hydraulic power unit to achieve double protection; and by configuring the second one-way valve 131, it prevents return of a flow output from the pump. Different from the pump-controlled scheme, by configuring the electromagnetic proportional reversing valve 133, the direction and flow capacity of the hydraulic oil can be changed; by configuring the second pressure measuring valve 138, an output pressure at a pump port is monitored; and by configuring the second overflow valve 137, it can provide overflow safety protection for the hydraulic system.

Figure 7:
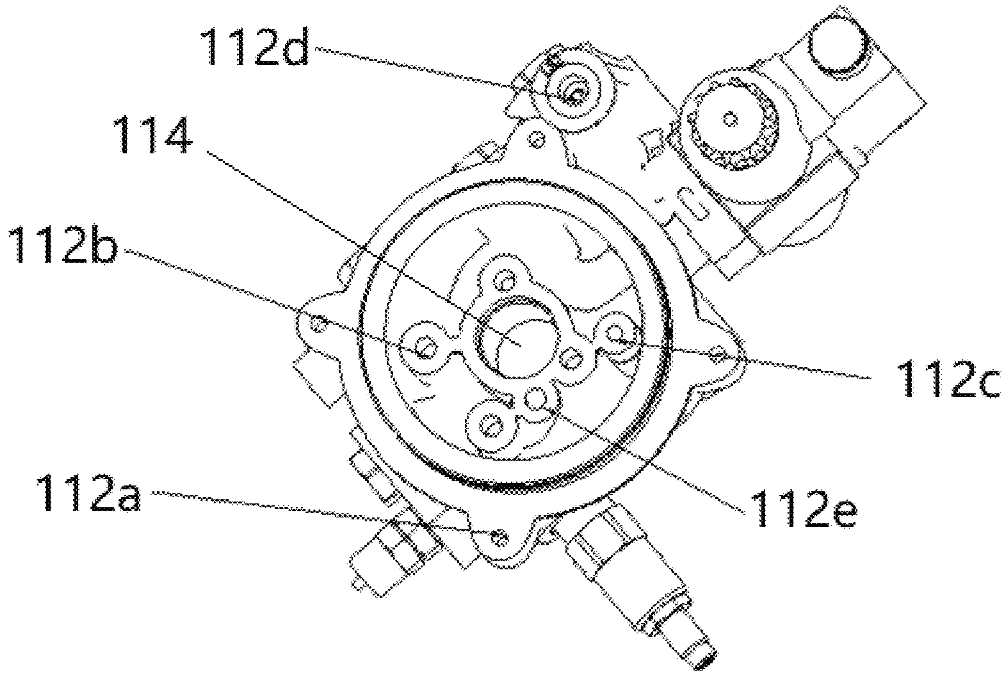
FIG. 7 is a schematic diagram of a side where the second mounting end is located in embodiments of an integrated hydraulic power device according to the present disclosure.

FIG. 7 is a schematic diagram of a side where the second mounting end is located in embodiments of an integrated hydraulic power device according to the present disclosure. Referring to FIGS. 1, 2 and 7, in some embodiments, the first mounting end 111 and the second mounting end 112 are located on two opposite sides of the valve body 11, and the valve body 11 further has a central hole 114 running through the first mounting end 111 and the second mounting end 112, a power output shaft 21 of the motor 2 being in drive connection with the hydraulic pump 4 through a coupling provided in the central hole 114.

As the first mounting end 111 and the second mounting end 112 are located on the two opposite sides of the valve body 11, the hydraulic pump 4 do not interfere with each of both the hydraulic oil tank 3 and the motor 2. Therefore, there is more flexibility in model selection and dimensions, and the relevant hydraulic plug-in can be arranged in a region between the first mounting end 111 and the second mounting end 112. The motor 2 can also use the central hole 114 to transmit power to the hydraulic pump 4 through the coupling so that the hydraulic pump 4 works.

Referring to the two types of integrated valves shown in FIGS. 5 and 6, on the side where the first mounting end 111 is located, the motor 2 can be threaded connected to a plurality of motor mounting fixing holes 111*a* located at the first mounting end 111 by means of bolts. Referring to FIG. 7, on the side where the second mounting end 112 is located, the hydraulic oil tank 3 is threaded connected to a plurality of tank mounting fixing holes 112*a* located at the second mounting end 112 by means of bolts.

In FIG. 7, the hydraulic pump 4 can be threaded connected to a pump mounting fixing hole 112*b* located at the second mounting end 112 by means of a bolt. The hydraulic pump 4 and the hose 52 of the oil port component 5 can be respectively connected to a pump oil suction port 112*e* and a valve body oil inlet 112*c* on the second mounting end 112. A load sensitive oil port 112*d* may also be provided on the second mounting end 112.

Figure 8:
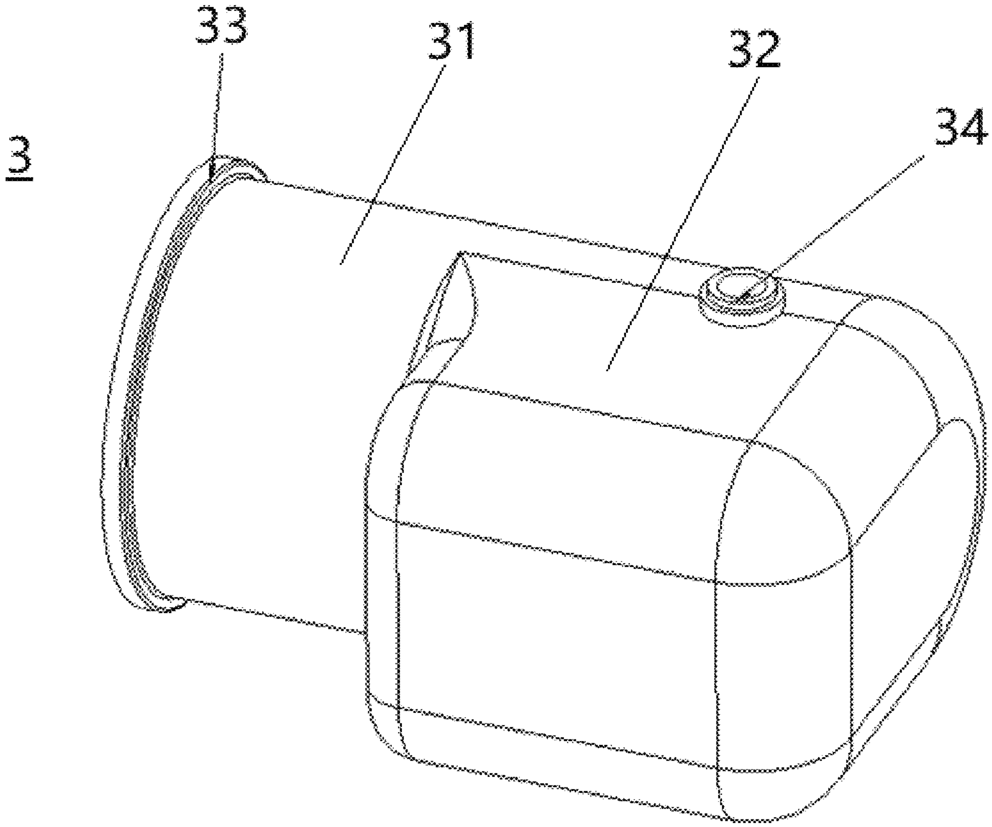
FIG. 8 is a structural diagram of a hydraulic oil tank in embodiments of an integrated hydraulic power device according to the present disclosure.

FIG. 8 is a structural diagram of a hydraulic oil tank in embodiments of an integrated hydraulic power device according to the present disclosure. Referring to FIG. 8, in some implementations, the material of the hydraulic oil tank 3 is a non-metallic material. Using a suitable non-metallic material can meet some specific needs for the integrated hydraulic power device, such as a reduced weight, reduced manufacturing difficulty, and the use of an unconventional shape.

For example, to achieve a special-shaped oil tank and reduce the weight and manufacturing cost of the oil tank, the non-metallic material may include polyethylene or polypropylene. In forming, a rotational molding or blow molding process can be used for forming, which is conducive to the manufacture of a hydraulic oil tank with a predetermined wall thickness (e.g., a wall thickness of 5 mm) and a specific shape.

In FIG. 8, the hydraulic oil tank 3 may include a first part 31 and a second part 32. The first part 31 is cylindrical in shape and has one end connected to the second mounting end 112. The second part 32 is connected to the other end of the first part 31 away from the valve body 11 and is internally communicated with the first part 31. In an axis direction of the first part 31, an inner cavity cross-sectional area of the second part 32 is larger than an inner cavity cross-sectional area of the first part 31.

In the hydraulic oil tank 3 with such a structure, the smaller inner cavity cross-sectional area is matched with the second mounting end of the valve body to lower dimensional requirements on the valve body, and the larger inner cavity cross-sectional area is used to increase the capacity of the valve body in order to accommodate more hydraulic oil and improve system performance.

Figure 9:
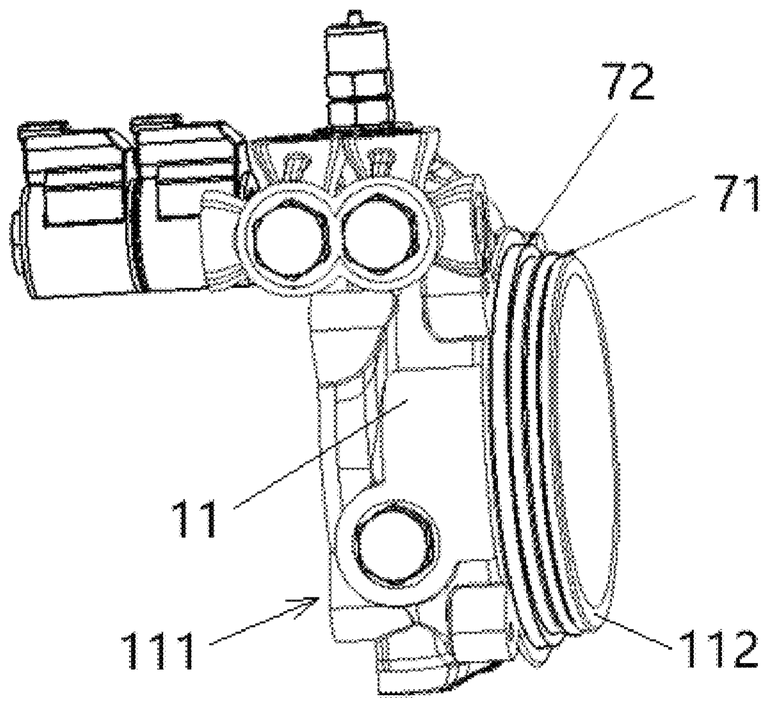
FIG. 9 is a schematic view of the installation structure in which the motor and hydraulic pump are omitted in FIG. 2.
Figure 10:
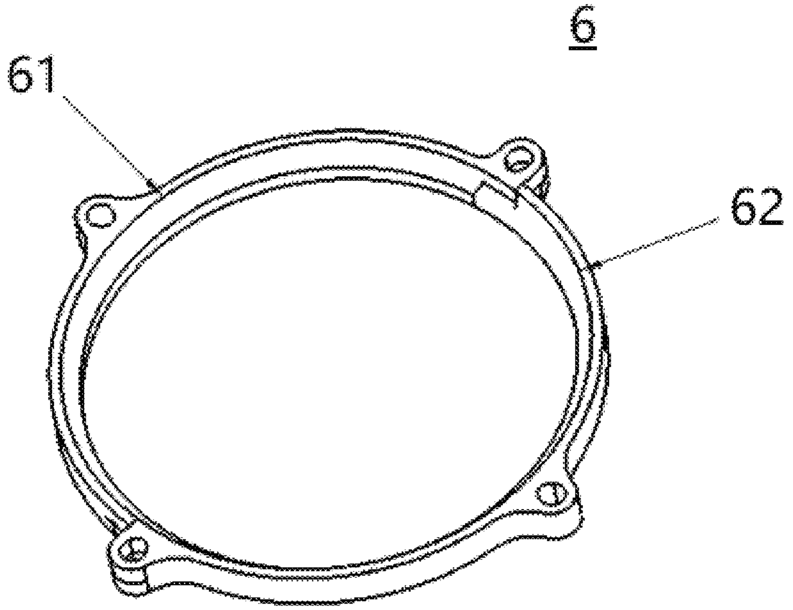
FIG. 10 is a structural diagram of a clamping ring in embodiments of an integrated hydraulic power device according to the present disclosure.
Figure 11:
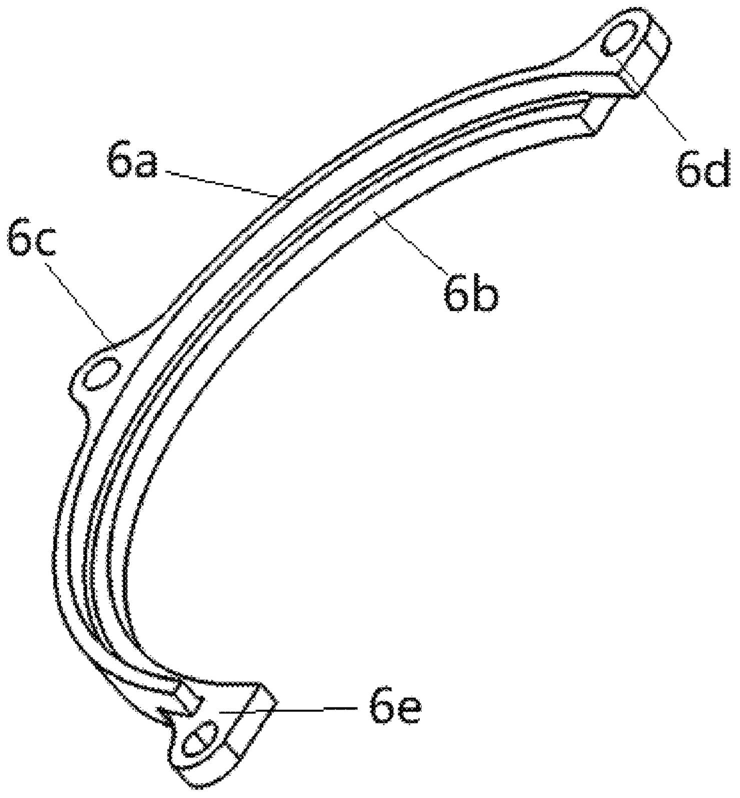
FIG. 11 is a structural diagram of a segment of the clamping ring in FIG. 10.

FIG. 9 is a schematic view of the installation structure in which the motor and hydraulic pump are omitted in FIG. 2. FIG. 10 is a structural diagram of a clamping ring in embodiments of an integrated hydraulic power device according to the present disclosure. FIG. 11 is a structural diagram of a segment of the clamping ring in FIG. 10.

Referring to FIGS. 8 to 11, in some embodiments, an open end of the hydraulic oil tank 3 has an annular flange 33 that protrudes radially outward. The integrated hydraulic power device further includes: a clamping ring 6, a first seal ring 71 and a second seal ring 72. The clamping ring 6 is sleeved outside the annular flange 33, and the hydraulic oil tank 3 is fixed to the second mounting end 112 by means of bolts through the clamping ring 6.

Referring to FIGS. 10 and 11, in some embodiments, the clamping ring 6 includes a plurality of segments 61, 62. The plurality of segments 61, 62 are connected successively along a circumferential direction of the clamping ring 6. The plurality of segments 61, 62 can be spliced to form a closed-loop clamping ring 6, thereby simplifying installation and detachment.

In FIG. 11, a segment of the clamping ring 6 includes a connected first part 6*a* and second part 6*b* along an axial direction of the clamping ring 6. The first part 6*a* is thinner in a radial direction than the second part 6*b*. The first part 6*a* and the second part 6*b* can form a step structure at an inner side of the clamping ring 6 so as to be in limiting fit with the annular flange 33.

The first part 6*a* is provided with a mounting hole 6*d* at an end protruding on one side in the circumferential direction relative to the second part 6*b*, and the second part 6*b* is provided with a mounting hole 6*e* at an end protruding on the other side in the circumferential direction relative to the first part 6*a*. The mounting hole 6*d* of one segment can be spliced with the mounting hole 6*e* of another segment and then fixed thereto by a bolt, and the mounting holes 6*e* thereof can be spliced with the mounting hole 6*d* of the other segment and then fixed thereto by a bolt. A mounting hole 6*c* may also be provided at the middle of the first part 6*a* (i.e., at a position between the mounting holes 6*d* and 6*e*).

Referring to FIG. 9, the first seal ring 71 is located between the second mounting end 112 and an inner cavity surface of the open end. Specifically, the first seal ring 71 may include an O-ring seal. The second seal ring 72 is located between the second mounting end 112 and the clamping ring 6. Specifically, the second seal ring 72 may include a flat washer.

Considering that if a non-metallic oil tank is adopted, there is a possibility of deformation and aging of the non-metallic oil tank, which may lead to leakage of the oil tank, a double sealing structure formed by the first seal ring 71 and the second seal ring 72 is used, which can effectively solve the problem of deformation of the non-metallic oil tank and ensure the sealing reliability of a whole integrated hydraulic power unit.

Figure 12:
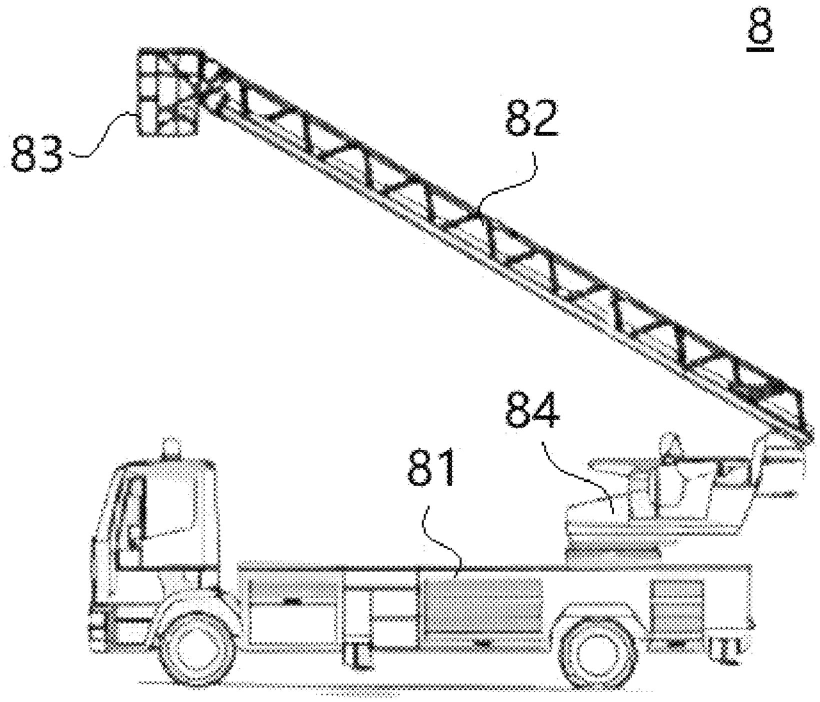
FIG. 12 is a structural diagram of some embodiments of a fire truck according to the present disclosure.

FIG. 12 is a structural diagram of some embodiments of a fire truck according to the present disclosure. The above embodiments of the integrated hydraulic power device of the present disclosure can be applied to various work scenarios that need hydraulic drive, including various engineering machinery products. An example is a aerial platform fire truck with many restrictions on weight and use of space. Thus, with reference to FIG. 12, embodiments of the present disclosure also provide a fire truck 8 including the integrated hydraulic power device in any of the foregoing embodiments. The fire truck here can be an aerial ladder fire truck, a lift-up fire engine or an aerial work platform truck.

In FIG. 12, the fire truck 8 may include a chassis 81, a turntable 84, an arm 82 and an aerial work platform 83. The arm 82 is rotatably arranged on the chassis 81 through the turntable 84, and the aerial work platform 83 may be arranged on the top of the arm 82. The integrated hydraulic power device in embodiments of the disclosure may be arranged at various locations on the fire truck 8, optionally on the aerial work platform 83.

At this point, embodiments of the present disclosure have been described in detail. To avoid obscuring the concept of the present disclosure, some details known in the art are not described. Based on the above description, those skilled in the art can fully understand how to implement the technical solutions disclosed herein.

Although some specific embodiments of the present disclosure have been described in detail by using examples, those skilled in the art should understand that the above examples are only for illustration and not for limiting the scope of the present disclosure. Those skilled in the art should understand that modifications to the above embodiments or equivalent substitutions to part of technical features can be made without departing from the scope and spirit of the present disclosure. The scope of the present disclosure is defined by the appended claims.

What is claimed is:

1. An integrated hydraulic power device, comprising:

an integrated valve comprising a valve body having an internal flow passage structure, a first mounting end and a second mounting end;

a motor fixedly arranged at the first mounting end;

a hydraulic oil tank fixedly arranged at the second mounting end; and a hydraulic pump located within the hydraulic oil tank and in drive connection with the motor, wherein the hydraulic pump has an oil suction port for drawing oil from the hydraulic oil tank, and the internal flow passage structure is communicated with the hydraulic oil tank and the hydraulic pump; an open end of the hydraulic oil tank has an annular flange that protrudes radially outward, and the integrated hydraulic power device further comprises:

a clamping ring sleeved outside the annular flange, the hydraulic oil tank being fixed to the second mounting end by means of bolts and the clamping ring;

a first seal ring located between the second mounting end and an inner cavity surface of the open end; and a second seal ring located between the second mounting end and the clamping ring.

2. The integrated hydraulic power device according to claim 1, further comprising:

an oil port component provided within the hydraulic oil tank, configured to implement oil return from the internal flow passage structure to the hydraulic oil tank, and/or to implement oil supply from the hydraulic oil tank to an external backup power system through the internal flow passage structure.

3. The integrated hydraulic power device according to claim 2, wherein the internal flow passage structure has a valve body oil inlet, and the oil port component comprises an oil port end and a hose, one end of the hose is connected to the valve body oil inlet and the other end of the hose is fluidly connected to the oil port end.

4. The integrated hydraulic power device according to claim 2, wherein the oil port component further comprises a filter, which is located at the oil port end.

5. The integrated hydraulic power device according to claim 1, wherein the valve body is a metal 3D printing valve body.

6. The integrated hydraulic power device according to claim 5, wherein a diameter of flow passages in the internal flow passage structure is less than or equal to 6 mm.

7. The integrated hydraulic power device according to claim 5, wherein a material of the metal 3D printing valve body comprises stainless steel, aluminum-magnesium-copper alloy, aluminum-magnesium-copper-zinc alloy, or aluminum-magnesium-silicon alloy.

8. The integrated hydraulic power device according to claim 1, wherein the valve body further has a plug-in port, and the integrated valve further comprises a hydraulic control plug-in connector, which is plugged in the plug-in port and communicated with the internal flow passage structure.

9. The integrated hydraulic power device according to claim 8, wherein the motor is a servo motor, and the integrated valve is a pump-controlled control valve, and the hydraulic control plug-in connector comprises at least one of a first one-way valve, an solenoid directional control valve, first shuttle valves, a first overflow valve and a first pressure measuring valve.

10. The integrated hydraulic power device according to claim 8, wherein the motor is a DC brushless motor, and the integrated valve is a valve-controlled control valve, and the hydraulic control plug-in connector comprises at least one of a second one-way valve, a pressure compensator, an electromagnetic proportional reversing valve, second shuttle valves, a second overflow valve, and a second pressure measuring valve.

11. The integrated hydraulic power device according to claim 1, wherein the first mounting end and the second mounting end are located on two opposite sides of the valve body, and the valve body also has a central hole running through the first mounting end and the second mounting end, a power output shaft of the motor is in drive connection with the hydraulic pump through a coupling provided in the central hole.

12. The integrated hydraulic power device according to claim 1, wherein the motor is threaded connected to a plurality of motor mounting fixing holes located at the first mounting end by means of bolts, and/or the hydraulic oil tank is threaded connected to a plurality of tank mounting fixing holes located at the second mounting end by means of bolts.

13. The integrated hydraulic power device according to claim 1, wherein a material of the hydraulic oil tank is a non-metallic material.

14. The integrated hydraulic power device according to claim 13, wherein the non-metallic material comprises polyethylene or polypropylene.

15. The integrated hydraulic power device according to claim 14, wherein the hydraulic oil tank comprises:

a first part, which is cylindrical in shape and has one end connected to the second mounting end; and a second part, which is connected to the other end of the first part away from the valve body and is internally communicated with the first part, wherein in an axis direction of the first part, an inner cavity cross-sectional area of the second part is larger than an inner cavity cross-sectional area of the first part.

16. The integrated hydraulic power device according to claim 1, wherein the clamping ring comprises a plurality of segments, and the plurality of segments are connected successively along a circumferential direction of the clamping ring.

17. The integrated hydraulic power device according to claim 1, wherein the first seal ring comprises an O-ring seal, and the second seal ring comprises a flat washer.

18. A fire truck, comprising:

the integrated hydraulic power device of claim 1.

19. The fire truck according to claim 18, wherein the fire truck is an aerial ladder fire truck, a lift-up fire engine or an aerial work platform truck.

* * * * *